United States Patent [19]

Lipschutz

[11] Patent Number: 4,552,000
[45] Date of Patent: Nov. 12, 1985

[54] STEERING SHAFT ANTI-THEFT DEVICE FOR MOTOR VEHICLE

[75] Inventor: Paul Lipschutz, Croissy, France
[73] Assignee: Neiman S.A., Courbevoie, France
[21] Appl. No.: 588,927
[22] Filed: Mar. 13, 1984
[30] Foreign Application Priority Data Mar. 25, 1983 [FR] France .............................. 83 04897

[51] Int. Cl.[4] ............................................ B60R 25/02
[52] U.S. Cl. ...................................... 70/185; 70/252; 70/386; 292/341.15
[58] Field of Search ................. 70/182, 183, 184, 185, 70/186, 252, 386; 292/341, 341.13, 341.15

[56] References Cited

U.S. PATENT DOCUMENTS

| | | | |
|---|---|---|---|
| 167,663 | 9/1875 | Heneu et al. | 292/341.15 |
| 2,890,581 | 6/1959 | Lewis | 70/252 |
| 3,553,984 | 1/1971 | Grumback | 292/341.15 |
| 3,688,861 | 9/1972 | Lipschultz | 70/252 |

Primary Examiner—Robert L. Wolfe
Attorney, Agent, or Firm—James C. Wray

[57] ABSTRACT

The invention relates to a steering shaft anti-theft device for a motor vehicle, of the type comprising a lock bolt interacting with at least one radial hollowed-out part of a sleeve integral with the steering shaft.

The anti-theft device according to the invention is characterized by the fact that the said sleeve is hollow and has an external slit over its entire periphery, the interior of the housing thus formed in the sleeve containing a plurality of free rotary elements and a stop integral with the sleeve, the assembly consisting of the said rotary elements and stop not occupying the entire circumferential space of the said housing, the lock bolt being able to occypy an unlocking position in which it is completely outside the said sleeve and a locking position in which it penetrates the said housing of the sleeve via the said peripheral slit.

15 Claims, 3 Drawing Figures

STEERING SHAFT ANTI-THEFT DEVICE FOR MOTOR VEHICLE

BACKGROUND OF THE INVENTION

The invention relates to a steering shaft anti-theft device for a motor vehicle, of the type comprising a lock bolt interacting with at least one radial hollowed-out part of a sleeve integral with or fixed to the steering shaft.

Anti-theft devices of the aforementioned type have performed their function satisfactorily for a number of decades but nevertheless suffer from various drawbacks or prove inconvenient in use. In the first place, since the bolt is practically never situated opposite a hollowed-out portion of the sleeve, so that a restoring spring has to be provided for the bolt, rendering the construction complicated and fragile, and the user has to turn the steering wheel, with the vehicle stationary and the engine shut off, in order to cause the bolt to engage. This operation, which the user often forgets to perform, involves considerable effort, particularly when the steering equipment includes a power steering auxiliary device, which is inoperative when the engine is not running.

Furthermore, to release the steering a torque often has to be applied to the steering wheel and may have to be quite considerable if a wheel is resting against the curb. In addition, these known systems are not suitable for the control of the bolt by means of an electrical, pneumatic or hydraulic device, particularly owing to the unlocking force often required.

Efforts have therefore been made to replace the anti-theft devices of the foregoing type by means to ensure the locking of the steering shaft in all positions. The devices proposed, however, are imperfect and/or complicated, so that the demand for them is limited.

OBJECT OF THE INVENTION

An object of the present invention is thus to provide a new steering shaft anti-theft device having the proven advantages of simplicity and reliability of the anti-theft devices of the type described in the preamble while at the same time reliably ensuring the locking action in all positions of the steering shaft and enabling the bolt to be withdrawn with the exertion of only a minimum amount of force.

SUMMARY OF THE INVENTION

According to the invention there is provided a steering shaft anti-theft lock for a motor vehicle comprising:
(a) a hollow annular sleeve for attachment to a steering shaft, said sleeve having an aperture extending around the entire periphery of the sleeve,
(b) a plurality of freely rotatable elements disposed within said sleeve,
(c) a stop member within the sleeve, said rotatable elements not occupying the entire circumferential space within said sleeve, and
(d) a lock bolt movable between first position when the bolt is free of the rotatable elements and a second position where the bolt penetrates the aperture and locates between, said rotatable elements being displaceable by said bolt along the circumferential space within said housing.

BRIEF DESCRIPTION OF DRAWINGS

The invention will be clearly understood from a reading of the following description by reference to the attached drawing, wherein.

DESCRIPTION OF PREFERRED EMBODIMENTS

The steering column, in a manner known per se, contains the steering shaft 2 to which is welded a sleeve 3. In accordance with the invention the sleeve 3 is hollow and includes a continuous peripheral slit 3'. Inside the housing provided in the sleeve 3 are rollers as well as a fixed roller 4' integral with the sleeve 3 and forming an abutment for the loose rollers 4. The rollers 4 and 4' do not occupy the whole of the circumferential space allocated to them in the hollowed-out part of the sleeve 3.

Figure 1:
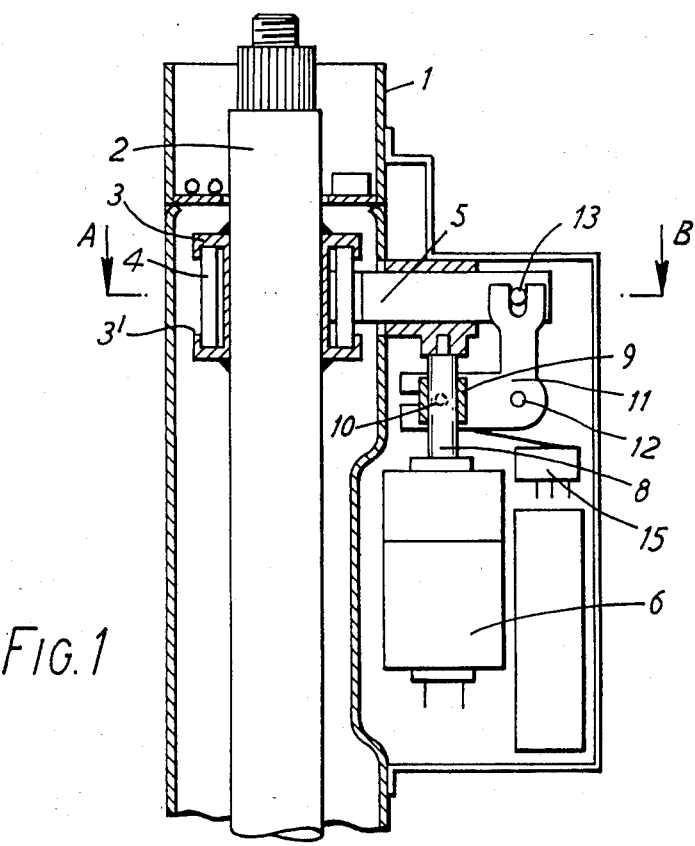
FIG. 1 is a schematic axial section, partly in elevation, of a steering column equipped with an anti-theft device in accordance with one embodiment of the invention.
Figure 2:
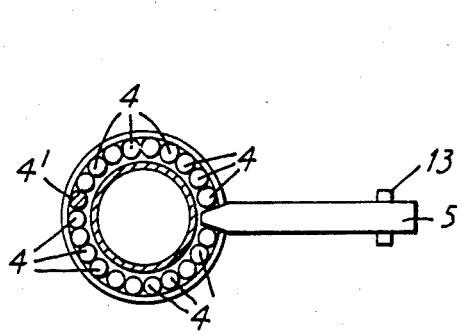
FIG. 2 is a partial section along the line A—B of FIG. 1.
Figure 3:
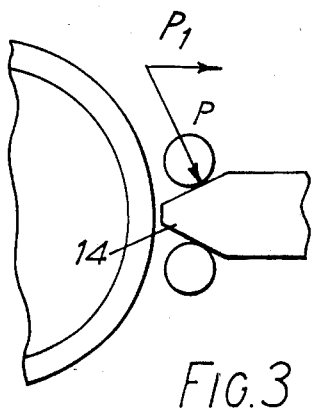
FIG. 3 is a detail view of FIG. 2 on a larger scale.

A lock bolt 5 is mounted in such a way that it can slide at right angles to the axis of the shaft 2, opposite to the slit 3' of the sleeve 3, and can occupy a locking position, shown in FIGS. 1-3, in which it has penetrated the interior of the sleeve 3 via the slit 3', moving aside the loose rollers 4 on each side, thanks to the free space provided between them. Any attempt to rotate the shaft 2 in one direction or the other causes the rollers 4 situated between the bolt 5 and the fixed roller 4' to close up, thus locking the shaft 2. The total clearance between the rollers 4 may be just a little more than the width of the bolt 5, in order to cause the shaft 2 to be locked practically without free play.

The bolt 5 is controlled by an actuator 6, such as an electric motor with a reduction gearing, an electromagnet, a pneumatic motor etc. The actuator 6 comprises a screw-threaded out push shaft 8 interacting with a nut 9 integral with a pivot 10. The pivot 10 interacts with an end fork or a lever 11 pivoted on a shaft 12. The other end of the lever 11 comprises a fork interacting with a shaft 13 integral with the lock bolt 5. A limit switch 15 limits the displacements undergone by the screw-threaded shaft 8 and consequently the bolt 5.

The actuator 6, which can naturally be replaced by a mechanical system with a lock controlling the displacement of a bolt 5 via a cam, is preferably controlled electrically by a remote control device.

The rollers 4 can be replaced by any equivalent rotary element such as balls or needles.

That end 14 of the lock bolt which penetrates the slit 3' on the sleeve 3 is preferably pointed, with a gradient sufficiently slight to prevent the bolt 5 from moving back when a force P (FIG. 3), emanating from a torque exerted on the shaft 2, is applied to the bolt in an attempt to nullify the anti-theft system. On the other hand the radial component $P_1$ of such a force P, which normally takes effect on the bolt 5 owing to the pressure of the rollers 4, facilitates the extraction of the bolt 5 under the action of the actuator 6.

Whatever the angular position occupied by the steering shaft 2 at the moment of the locking operation the point 15 of the bolt 5 moves aside the rollers 4 on each side, practically any stress, owing to the rolling movement of these rollers. If the bolt 5 is situated opposite the fixed roller 4' its point 5 will move all the rollers 5 aside, causing them to close up against the opposite edge of the fixed roller 4'. As has been stated, the extraction of the bolt, which necessitates practically no effort, is rendered still easier by the components $P_1$ of the pressure force P of the rollers 4.

I claim:

1. A steering shaft anti-theft lock for a motor vehicle comprising:
   (a) a hollow annular sleeve for attachment to a steering shaft, said sleeve having an aperture extending around the entire periphery of the sleeve,
   (b) a plurality of freely rotatable elements disposed within said sleeves,
   (c) a stop member within the sleeve, said rotatable elements not occupying the entire circumferential space within said sleeve, and
   (d) a lock bolt movable between first position where the bolt is free of the rotatable elements and a second position where the bolt penetrates the aperture and locates between, said rotatable elements being displaceable by said bolt along the circumferential space within said housing.

2. An anti-theft lock according to claim 1, wherein the said freely rotatable elements consist of loose rollers.

3. An anti-theft lock according to claim 1, wherein said freely rotatable elements consist of ball bearings.

4. An anti-theft lock according to claim 1, wherein said freely rotatable elements consist of needle bearings.

5. An anti-theft lock according to claim 1 wherein stop has a rounded peripheral surface.

6. An anti-theft lock according to claim 1 wherein the end of the bolt which is situated opposite to the sleeve has an elongated part.

7. An anti-theft lock according to claim 1, wherein the lock bolt is controlled by an actuator.

8. An anti-theft lock according to claim 7, wherein the actuator is operated by electrical remote control.

9. An anti-theft lock according to claim 1, wherein the lock bolt 5 is controlled by a lock mechanism.

10. An anti-theft lock according to claim 2 wherein stop has a rounded peripheral surface.

11. An anti-theft lock according to claim 3 wherein stop has a rounded peripheral surface.

12. An anti-theft lock according to claim 4 wherein stop has a rounded peripheral surface.

13. An anti-theft lock according to claim 2 wherein the end of the bolt which is situated opposite to the sleeve has an elongated part.

14. An anti-theft lock according to claim 3 wherein the end of the bolt which is situated opposite to the sleeve has an elongated part.

15. An anti-theft lock according to claim 4 wherein the end of the bolt which is situated opposite to the sleeve has an elongated part.

* * * * *